United States Patent [19]

Sasaki et al.

[11] Patent Number: 5,143,880
[45] Date of Patent: Sep. 1, 1992

[54] SOLID CATALYST COMPONENT FOR USE IN POLYMERIZATION OF α-OLEFINS

[75] Inventors: Toshio Sasaki; Takeshi Ebara, both of Ichihara; Kiyoshi Kawai, Chiba, all of Japan

[73] Assignee: Sumitomo Chemical Company, Limited, Osaka, Japan

[21] Appl. No.: 667,747

[22] Filed: Mar. 11, 1991

[30] Foreign Application Priority Data

Mar. 14, 1990 [JP] Japan ................... 2-064725

[51] Int. Cl.$^5$ .............................. C08F 4/656
[52] U.S. Cl. ................... 502/112; 502/108; 502/115; 502/116; 526/119
[58] Field of Search ............... 502/112, 115, 116, 126, 502/127, 108

[56] References Cited

U.S. PATENT DOCUMENTS

| | | | |
|---|---|---|---|
| 4,295,991 | 10/1981 | Wristers | 502/108 X |
| 4,326,988 | 4/1982 | Welch et al. | 502/108 X |
| 4,672,050 | 6/1987 | Sasaki et al. | 502/116 |

FOREIGN PATENT DOCUMENTS

| | | |
|---|---|---|
| 0312314 | 4/1989 | European Pat. Off. |
| 57-15160 | 2/1982 | Japan |
| 63-89509 | 4/1988 | Japan |

Primary Examiner—Patrick P. Garvin
Attorney, Agent, or Firm—Stevens, Davis, Miller & Mosher

[57] ABSTRACT

A solid-catalyst component for use in the polymerization of α-olefins obtained by
reducing a titanium compound represented by the following general formula:

$$Ti(OR^1)_n X_{4-n}$$

wherein $R^1$ represents a hydrocarbon group having 1 to 20 carbon atoms, X represents a halogen atom and n represents a number satisyfing $0 < n \leq 4$, with an organomagnesium compound in the presence of an organic silicon compound having Si—O bond to produce a solid product,
treating the solid product with an ester compound,
treating the ester-treated solid product with a mixture of an ether compound and titanium tetrachloride or with a mixture of an ether compound, titanium tetrachloride and an ester compound to obtain a trivalent titanium compound-containing solid catalyst precursor, and
treating the solid catalyst precursor with a small quantity of an olefin in the presence of an organoaluminum compound to obtain a solid catalyst component for use in the polymerization of α-olefins.

32 Claims, 2 Drawing Sheets

FIG. 1

SOLID CATALYST COMPONENT FOR USE IN POLYMERIZATION OF α-OLEFINS

BACKGROUND OF THE INVENTION

1. Field of the Invention

This invention relates to a solid catalyst component for use in the polymerization of α-olefins. More particularly, this invention relates to a solid catalyst component for use in the polymerization of α-olefins, which is quite excellent in catalytic activity and stereospecificity and improved in resistance to grinding, characteristics of particles and convenience in handling.

2. Description of the Prior Art

As a general process for producing a polymer of α-olefin such as propylene, butene-1 and the like, the use of the so-called Ziegler-Natta catalyst consisting of a compound of transition metal belonging to Group IV-VI of the periodic table and an organometal compound belonging to Group I-III of the periodic table is well known.

In such a production process, however, an amorphous polymer is formed as a by-product in addition to a highly stereospecific α-olefin polymer having a high industrial value.

The amorphous polymer is low in industrial utilizability and exercises a very adverse influence upon mechanical properties of the α-olefin polymer when the polymer is processed into film, fiber and other forms and put to use.

Further, formation of the above-mentioned amorphous polymer causes a loss of starting monomer and makes it indispensably necessary to provide an apparatus for removing the amorphous polymer, which is quite disadvantageous from the industrial point of view.

Accordingly, if a process entirely free from formation of such an amorphous polymer or a process for forming only a slight quantity of amorphous polymer is discovered, it will be quite advantageous.

On the other hand, in such a polymerization process as above, catalyst residue remains in the resulting α-olefin polymer, which makes troubles in various points such as stability, processability, etc. of the α-olefin polymer. Thus, it is necessary to provide an apparatus for removing the catalyst residue and stabilizing the polymer.

This fault can be overcome by increasing the catalytic activity expressed by the weight of formed α-olefin polymer per unit weight of catalyst. By this increase, the apparatus for removing catalyst residue becomes unnecessary and production cost of α-olefin polymer can be reduced.

The present inventors previously proposed a process which comprises treating, with an ester compound, an ether compound and titanium tetrachloride, a solid product obtained by reducing an alkoxytitanium compound with an organomagnesium compound in the presence of an organic silicon compound having Si—O bond [U.S. Pat. 4,672,050, Japanese Patent Application KOKAI (Laid-Open) No. 1-319508]. The catalyst obtained according to this process could overcome the above-mentioned fault in stereospecificity and catalyst activity.

The solid catalyst component obtained by the above-mentioned process is usually dried until it reaches a fluidizable state and thereafter put to use, for the reason of convenience for use, in many cases.

As a drier used for drying powdery materials, various driers have been proposed. For example, as material-standing and material-conveyance type driers; vacuum box type drier, freeze dried box type drier, ordinary pressure drum drier, vacuum drum drier, vertical drier, cylindrical drier, band drier and the like can be referred to. As material-agitation type driers; ventilation rotary drier, ventilation agitation drier, fluidized bed drier, cylindrical agitation drier, multi-stage disc drier, grooved agitation drier and the like can be referred to. Further, as hot air conveyance type driers, spray drier, air stream drier and the like can be referred to. A variety of driers constituted of combination of these driers are also used. In the case of a solid catalyst component for olefin polymerization which must be handled in an inert gas and made free from organic solvent by a drying process, there are often used driers in which ventilation and agitation are combined such as ventilation rotary drier, ventilation agitation drier, gas stream drier and fluidized bed drier, with consideration of safety, convenience in handling and cost.

However, a solid catalyst component obtained by the above-mentioned process has a problem that fine powder is formed by friction between particles in the process of drying treatment accompanied by powder flow. Such a solid catalyst component containing fine powder deteriorates the particle size distribution of the resulting α-olefin polymer which copies the shape of the solid catalyst component, and thereby forms a fine powdery polymer. Further, the fine powder agglomerates in the course of polymerization to clog the lines of polymer-producing apparatus and makes it impossible to produce a polymer stably. Accordingly, elimination of such a fine powder from the solid catalyst component will bring about a great merit.

As a technique for improving the crushability of solid catalyst component, there has been disclosed a method which comprises preliminarily polymerizing an olefin in the presence of a solid catalyst component and thereby preventing the formation of fine powder at the time of supplying a slurry of the solid catalyst component into polymerization reactor by means of a circulating pump [Japanese Patent Application KOKAI (Laid-Open) No. 57-151602]. However, such a method has a problem that the solid catalyst component comes to coexist with an organoaluminum compound during the period from completion of preliminary polymerization to its feeding into the polymerization reactor and, during this period of storage, its activity is deteriorated with the lapse of time. Further, there has been disclosed a method [Japanese Patent Application KOKAI (Laid-Open) No. 63-89509]which comprises inserting a step of preliminary polymerization of α-olefin into the step of synthesizing a solid-catalyst component and thereafter treating the catalyst component with a titanium compound to obtain a solid catalyst component in order to prevent the pulverization of the particles of solid catalyst component in the course of synthesizing the solid catalyst component. However, even if such a method is applied to the technique previously proposed by the prior arts [U.S. Pat. No. 4,672,050, Japanese Patent Application KOKAI (Laid-Open) No. 1-319508], the preliminarily polymerized polymer dissolves into solvent at the time of treating the solid catalyst component with a titanium compound and filtration cannot be effected satisfactorily or the remaining organoaluminum compound reacts with the titanium compound to form an undesirable compound decreasing the polymerization activity and stereospecificity.

SUMMARY OF THE INVENTION

In view of the above-mentioned state of things, the problem to be solved by this invention or the object of this invention is to provide a process for producing a solid catalyst component for use in the polymerization of α-olefin having so high a catalytic activity and a stereospecificity as to make it unnecessary to remove catalyst residue and amorphous polymer, which is improved in crush resistance, particle characteristics and convenience to handle.

Thus, this invention relates to a solid catalyst component for use in the polymerization of α-olefins obtained by reducing a titanium compound represented by general formula $Ti(OR^1)_nX_{4-n}$ wherein $R^1$ represents a hydrocarbon group having 1 to 20 carbon atoms, X represents a halogen atom, and n represents a number satisfying $0<n\leq 4$, with an organomagnesium compound in the presence of an organic silicon compound having a Si—O bond to obtain a solid product, treating the solid product with an ester compound, thereafter treating it with a mixture of an ether compound and titanium tetrachloride or a mixture of an ether compound, titanium tetrachloride and an ester compound to obtain a trivalent titanium compound-containing solid catalyst precursor, and treating the solid catalyst precursor with a small quantity of an olefin in the presence of an organoaluminum compound.

By adopting the process of this invention, the above-mentioned object and particularly an improvement of the solid catalyst particle in crush resistance can be achieved.

DETAILED DESCRIPTION OF THE INVENTION

Next, this invention will be explained below more concretely.

Titanium Compound

The titanium compound used in this invention is represented by the following general formula:

$$Ti(OR^1)_nX_{4-n}$$

wherein $R^1$ represents a hydrocarbon group having 1 to 20 carbon atoms, X represents a halogen atom, and n represents a number satisfying $0<n\leq 4$.

Concrete examples of $R^1$ include alkyl groups such as methyl, ethyl, propyl, isopropyl, butyl, isobutyl, amyl, isoamyl, hexyl, heptyl, octyl, decyl, dodecyl and the like; aryl groups such as phenyl, cresyl xylyl, naphthyl and the like; cycloalkyl groups such as cyclohexyl, cyclopentyl and the like; allyl groups such as propenyl and the like; and aralkyl groups such as benzyl and the like. Among them, alkyl groups having 2 to 18 carbon atoms and aryl groups having 6 to 18 carbon atoms are preferable, and straight chain alkyl groups having 2 to 18 carbon atoms are particularly preferred. It is also possible to use two or more kinds of titanium compounds different in $OR^1$.

Examples of the halogen atom represented by X include chlorine, bromine and iodine. Among them, chlorine give a particularly good result.

The value of n in the general formula $Ti(OR^1)_nX_{4-n}$ is a value satisfying $0<n\leq 4$, preferably $2\leq n\leq 4$, and particularly preferably $n=4$.

As the method for synthesizing the titanium compound represented by general formula $Ti(OR^1)_nX_{4-n}$ $(0<n\leq 4)$, well known methods can be used. For example, a method of reacting $Ti(OR^1)_4$ and $TiX_4$ at a predetermined ratio, or a method of reacting $TiX_4$ with a predetermined quantity of the corresponding alcohol can be used.

Organic Silicon Compound Having Si—O Bond

The organic silicon compound having Si—O bond used in synthesizing the solid catalyst component of this invention is represented by the following general formulas:

$$Si(OR^2)_mR^3_{4-m}$$

$$R^4(R^5_2SiO)_pSiR^6_3$$

$$(R^7_2SiO)_q$$

where $R^2$ represents a hydrocarbon group having 1 to 20 carbon atoms, $R^3$, $R^4$, $R^5$, $R^6$ and $R^7$ each represents a hydrocarbon group having 1 to 20 carbon atoms or a hydrogen atom, m represents a number satisfying $0<m\leq 4$, p represents an integer of 1 to 1,000, and q represents an integer of 2 to 1,000.

Concrete examples of the organic silicon compound include tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethlxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, phenylhydropolysiloxane, and the like.

Among these organic silicon compounds, alkoxysilane compounds represented by general formula $Si(OR^2)_mR^2_{4-m}$ are preferable, wherein m preferably satisfies $1\leq m\leq 4$. Among them, tetraalkoxysilane compounds wherein $m=4$ are particularly preferable.

Organomagnesium Compounds

Next, the organomagnesium compound used in this invention may be any forms of organomagnesium compounds, so long as they have a magnesium-carbon bond. Among them, Grignard compounds represented by general formula $R^8MgX$, wherein $R^8$ represents a hydrocarbon group having 1 to 20 carbon atoms and X represents a halogen, and dialkyl- or diaryl-magnesium compounds represented by general formula $R^9R^{10}Mg$, wherein $R^9$ and $R^{10}$ each represents a hydrocarbon group having 1 to 20 carbon atoms, are particularly preferable. In these formulas, $R^8$, $R^9$ and may be identical or different one another and each represents an alkyl, aryl, aralkyl or alkenyl group having 1 to 20 carbon atoms such as methyl, ethyl, propyl, isopropyl, butyl, sec-butyl, tert-butyl, amyl, isoamyl, hexyl, octyl, 2-ethylhexyl, phenyl, benzyl and the like.

Concrete examples of the Grignard compound include methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmangesium chloride, phenylmagnesium chloride, phenylmagnesium bromide and the like. Concrete examples of the compound represented by $R^9R^{10}Mg$ include diethylmagnesium, dipropylmagnesium, diisopropylmagnesium, dibutylmagnesium, di-sec-butylmagnesium, di-tert-bytylmagnesium, butyl-sec-butylmagnesium, diamylmagnesium, diphenylmagnesium and the like.

As the solvent used in the synthesis of the above-mentioned organomagnesium compounds, etheral solvents such as diethyl ether, dipropyl ether, diisopropyl ether, dibutyl ether, diisobutyl ether, diamyl ether, diisoamyl ether, dihexyl ether, dioctyl ether, diphenyl ether, dibenzyl ether, phenetole, anisole, tetrahydrofuran, tetrahydropyran and the like can be referred to. Hydrocarbon solvents such as hexane, heptane, octane, cyclohexane, methylcyclohexane, benzene, toluene, xylene and the like and mixtures of an etheral solvent and a hydrocarbon solvent are also usable. Preferably, the organomagnesium compound is used in the form of a solution in a solution of ether compound. As the ether compound used for this purpose, ether compounds having 6 or more carbon atoms in one molecule and ether compounds having a cyclic structure can be referred to.

From the viewpoint of catalytic activity, it is particularly preferable to use a Grignard compound represented by $R^8MgCl$ in the form of a solution in an ether compound.

It is also possible to use the above-mentioned organomagnesium compound in the form of a hydrocarbon-soluble complex with an organometallic compound. Examples of said organometallic compound include organic compounds of Li, Be, B, Al and Zn.

Ester Compounds

The ester compounds which can be used in this invention are esters of mono- and poly-valent carboxylic acids, which include aliphatic carboxylic esters, olefinic carboxylic esters, alicyclic carboxylic esters and aromatic carboxylic esters.

Concrete examples of the ester compound include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, dipropyl phthalate, diisopropyl phthalate, dibutyl phthalate, diisobutyl phthalate, diheptyl phthalate, dioctyl phthalate, diphenyl phthalate and the like.

Among these ester compounds, olefinic carboxylic esters, such as methacrylic esters and maleic esters, and phthalic esters are preferable, and phthalic diesters are particularly preferable.

Ether Compounds

Next, as the ether compound used in this invention, dialkyl ethers such as diethyl ether, dipropyl ether, diisopropyl ether, dibutyl ether, diamyl ether, diisoamyl ether, dineopentyl ether, dihexyl ether, dioctyl ether, methyl butyl ether, methyl isoamyl ether, ethyl isobutyl ether and the like are preferable. Among them, dibutyl ether and diisoamyl ether are particularly preferable.

Organoaluminum Compounds

The organoaluminum compound used in this invention has at least one aluminum-carbon bond in one molecule. Typical examples of the organoaluminum compound are those represented by the following general formulas:

$$R^{11}{}_\gamma AlY_{3-\gamma}$$

$$R^{12}R^{13}Al-O-AlR^{14}R^{15}$$

wherein $R^{11}$, $R^{12}$, $R^{13}$, $R^{14}$ and $R^{15}$ each represents a hydrocarbon group having 1 to 20 carbon atoms, Y represents halogen, hydrogen or an alkoxy group, and $\gamma$ represents a number satisfying $2 \leq \gamma \leq 3$.

Concrete examples of the organoaluminum compound include trialkylaluminums such as triethylaluminum, triisobutylaluminum, trihexylaluminum and the like; dialkylaluminum hydrides such as diethylaluminum hydride, diisobutylaluminum hydride and the like; mixtures of trialkylaluminum and dialkylaluminum halide; mixtures of trialkylaluminum and alkylaluminum alkoxide; and alkylalumoxanes such as tetraethyldialumoxane, tetrabutyldialumoxane and the like.

Among these organoaluminum compounds, trialkyluminums, mixtures of trialkylaluminum and dialkylaluminum halide, and alkylalumoxanes are preferable, and among them triethylaluminum, triisobutylaluminum, a mixture of triethylaluminum and diethylaluminum chloride, and tetraethyldialumoxane are particularly preferable.

Olefins

The olefins used in this invention for treatment of solid catalyst precursor are those having 2 to 20 carbon atoms. Concrete examples of the olefin include ethylene, propylene, butene-1, pentene-1, hexene-1, 3-methylbutene-1, 3-methylpentene-1, 4-methylpentene-1, octene-1, decene-1, dodecene-1 and the like. Among these olefins, those having 2 through 8 carbon atoms are preferable, and those having 2 through 5 carbon atoms are particularly preferable.

Electron Donors

When a solid catalyst precursor is treated with a small quantity of olefin in the presence of organoaluminum compound in this invention, the treatment may be carried out in the presence of an electron donor, if desired. Said electron donor is selected from the group consisting of organic silicon compounds having Si—OR$^{16}$ bond wherein $R^{16}$ represents a hydrocarbon group having 1 to 20 carbon atoms or a Si—N—C bond, aromatic carboxylic ester compounds and sterically hindered amines.

As the organic silicon compound, alkoxysilane compounds represented by general formula $R^{17}{}_t\text{Si}(OR^{16})_{4-t}$ wherein $R^{17}$ and $R^{16}$ each represents a hydrocarbon group having 1 to 20 carbon atoms and t represents a number satisfying $0 \leq t \leq 3$ are preferably used.

As the aromatic carboxylic ester compound, methyl benzoate, ethyl benzoate, propyl benzoate, isopropyl benzoate, butyl benzoate, phenyl benzoate, methyl toluylate, ethyl toluylate, methyl anisate, ethyl anisate, monoethyl phthalate, dimethyl phthalate, methyl ethyl phthalate, diethyl phthalate, dipropyl phthalate, diisopropyl phthalate, dibutyl phthalate, diisobutyl phthalate, diheptyl phthalate, dioctyl phthalate, diphenyl phthalate and the like can be referred to.

As the sterically hindered amine, 2,6-substituted piperidines, 2,5-substituted pyrrolidines, and substituted methylenediamine compounds such as N,N,N',N'-tetramethylmethylenediamine and the like can be referred to.

Among these electron donors, alkoxysilane compounds represented by general formula $R^{17}{}_t\text{Si}(OR^{16})_{4-t}$ and 2,6-substituted piperidines give a particularly good result.

Concrete examples of said alkoxysilane compound include the followings:

Si—(OCH₃)₄, CH₃—Si—(OCH₃)₃, (CH₃)₂—Si—(OCH₃)₂, (C₂H₅)₂—Si—(OCH₃)₂, (C₆H₁₁)₂—Si—(OCH₃)₂, (isoC₄H₉)₂—Si—(OCH₃)₂, (C₈H₁₇)₂—Si—(OCH₃)₂, C₂H₅—Si—(OCH₃)₃, C₆H₁₁—Si—(OCH₃)₃, isoC₄H₉—Si—(OCH₃)₃, C₈H₁₇—Si—(OCH₃)₃, C₆H₅—Si—(OCH₃)₃, C₆H₅(CH₃)Si—(OCH₃)₂, C₆H₅(C₂H₅)Si—(OCH₃)₂, Si—(OCH₂H₅)₄, CH₃—Si—(OCH₂H₅)₃, C₂H₅—Si—(OCH₂H₅)₃, C₂H₃—Si—(OC₂H₅)₃, C₆H₅—Si—(OC₂H₅)₃, (C₆H₅)₂Si—(OCH₃)₂, (C₆H₅)₂Si—(OC₂H₅)₂, C₄H₉—Si—(OC₂H₅)₃, -continued C₂H₃—Si—(OC₄H₉)₃, (C₂H₅)₂—Si—(OC₂H₅)₂, isoC₃H₇(CH₃)Si—(OCH₃)₂, isoC₃H₇(C₂H₅)Si—(OCH₃)₂, isoC₃H₇(C₃H₇)Si—(OCH₃)₂, isoC₃H₇(C₄H₉)Si—(OCH₃)₂, isoC₃H₇(C₅H₁₁)Si—(OCH₃)₂, isoC₃H₇(C₆H₁₃)Si—(OCH₃)₂, isoC₃H₇(CH₃)Si—(OC₂H₅)₂, isoC₃H₇(C₂H₅)Si—(OC₂H₅)₂, isoC₃H₇(C₃H₇)Si—(OC₂H₅)₂, isoC₃H₇(C₄H₉)Si—(OC₂H₅)₂, isoC₃H₇(C₅H₁₁)Si—(OC₂H₅)₂, isoC₃H₇(C₆H₁₃)Si—(OC₂H₅)₂, isoC₄H₉(CH₃)Si—(OCH₃)₂, isoC₄H₉(C₂H₅)Si—(OCH₃)₂, isoC₄H₉(C₃H₇)Si—(OCH₃)₂, isoC₄H₉(C₄H₉)Si—(OCH₃)₂, isoC₄H₉(C₅H₁₁)Si—(OCH₃)₂, isoC₄H₉(C₆H₁₃)Si—(OCH₃)₂, isoC₄H₉(CH₃)Si—(OC₂H₅)₂, isoC₄H₉(C₂H₅)Si—(OC₂H₅)₂, isoC₄H₉(C₃H₇)Si—(OC₂H₅)₂, isoC₄H₉(C₄H₉)Si—(OC₂H₅)₂, isoC₄H₉(C₅H₁₁)Si—(OC₂H₅)₂, isoC₄H₉(C₆H₁₃)Si—(OC₂H₅)₂, tertC₄H₉(CH₃)Si—(OCH₃)₂, tertC₄H₉(C₂H₅)Si—(OCH₃)₂, tertC₄H₉(C₃H₇)Si—(OCH₃)₂, tertC₄H₉(C₄H₉)Si—(OCH₃)₂, tertC₄H₉(CH₃)Si—(OC₂H₅)₂, tertC₄H₉(C₂H₅)Si—(OC₂H₅)₂, tertC₄H₉(C₃H₇)Si—(OC₂H₅)₂, tertC₄H₉(C₄H₉)Si—(OC₂H₅)₂, C₂H₅—C(CH₃)(CH₃)—Si—(OCH₃)₂, C₂H₅—C(CH₃)(CH₃)—Si—(OCH₃)₂,

(with CH₃ and C₂H₅ side groups respectively)

C₂H₅—C(CH₃)(CH₃)—Si—(OCH₃)₂, C₂H₅—C(CH₃)(CH₃)—Si—(OCH₃)₂,

(with C₃H₇ and C₄H₉ side groups respectively)

C₂H₅—C(CH₃)(CH₃)—Si—(OC₂H₅)₂, C₂H₅—C(CH₃)(CH₃)—Si—(OC₂H₅)₂, (with CH₃ and C₂H₅ side groups respectively)

-continued and the like.

Examples of the 2,6-substituted piperidine include 2,2,6,6-tetramethylpiperidine and the like.

Synthesis of Solid Catalyst Component

The solid catalyst component of this invention is synthesized by reducing a titanium compound with an organomagnesium compound in the presence of an organic silicon compound to form a solid product, treating the solid product first with an ester compound and subsequently with a mixture of an ether compound and titanium tetrachloride or with a mixture of an ester compound, an ether compound and titanium tetrachloride to form a trivalent titanium compound-containing solid catalyst precursor, and then treating the latter with a small quantity of olefin in the presence of an organoaluminum compound.

The synthetic reactions are all performed in an atmosphere of inert gas such as nitrogen, argon or the like or in an atmosphere of an olefin.

As the method for reducing a titanium compound with an organomagnesium compound, a method which comprises adding an organomagnesium compound to a mixture of a titanium compound and an organic silicon compound or an inverse method which comprises adding a mixture of a titanium compound and an organic silicon compound to a solution of an organomagnesium compound may both be adopted. Of these two methods, the method of adding an organomagnesium compound to a mixture of titanium compound and organic silicon compound is more preferable from the viewpoint of catalytic activity.

Preferably, the titanium compound and the organic silicon compound are used in the form of a solution or a dilution in an appropriate solvent.

As said solvent, aliphatic hydrocarbons such as hexane, heptane, octane, decane and the like, aromatic hydrocarbons such as toluene, xylene and the like, alicyclic hydrocarbons such as cyclohexane, methylcyclohexane, decaline and the like and ether compounds such as diethyl ether, dibutyl ether, diisoamyl ether, tetrahydrofuran and the like are used.

The temperature of the reduction is $-50°$ C. to $70°$ C., preferably $-30°$ C. to $50°$ C., and particularly preferably $-25°$ C. to $35°$ C. If the temperature of reduction is too high, catalytic activity is deteriorated.

The production of a solid product by the reduction of titanium compound with an organomagnesium compound may be carried out in the presence of a porous material made of inorganic oxide, organic polymer or the like in order to impregnate the solid product into the porous material.

As said porous material, those having a pore volume of 0.3 ml/g or above at a pore radius of 200 to 2,000 angstroms (Å) and having a mean particle diameter of 5 to 300 μm are preferable.

As said porous inorganic oxide, $SiO_2$, $Al_2O_3$, MgO, $TiO_2$, $ZrO_2$, $SiO_2$, $Al_2O_2$, $MgO \cdot Al_2O_3$, $MgO \cdot SiO_2 \cdot Al_2O_3$ and the like can be referred to.

As said porous organic polymer, polystyrene type, polyacrylic ester type, polymethacrylic ester type, polyacrylonitrile type, polyvinyl chloride type and polyolefin type polymers can be referred to, of which typical examples include polystyrene, styrene-divinylbenzene copolymer, styrene-N,N'-alkylenedimethacrylamide copolymer, styrene-ethylene glycol dimethyl methacrylate copolymer, methyl polyacrylate, ethyl polyacrylate, methyl acrylate-divinylbenzene copolymer, ethyl acrylate-divinylbenzene copolymer, polymethyl methacrylate, methyl methacrylate-divinylbenzene copolymer, polyethylene glycol dimethyl methacrylate, polyacrylonitrile, acrylonitriledivinylbenzene copolymer, polyvinyl chloride, polyvinylpyrrolidine, polyvinylpyridine, ethylvinylbenzene-divinylbenzene copolymer, polyethylene, ethylene-methyl acrylate copolymer, polypropylene and the like. Among these porous materials, $SiO_2$, $Al_2O_3$ and polystyrene type polymers are preferable.

Although the time of addition is not critical, it is usually about 30 minutes to about 6 hours. After completion of the reduction, a post reaction may be carried out at a temperature of $20°$ C. to $120°$ C. for 0.5 to 6 hours.

As expressed in terms of atomic ratio of silicon atom to titanium atom (Si/Ti), the organic silicon compound is used in an amount of 1 to 50, preferably 3 to 30 and particularly preferably 5 to 25.

As expressed in terms of atomic ratio of the sum of titanium and silicon atoms to magnesium atom (Ti+Si/Mg), the organomagnesium compound is used in an amount of 0.1 to 10, preferably 0.2 to 5.0, and particularly preferably 0.5 to 2.0.

The solid product obtained by the reduction is separated from liquid matter and several times washed with an inert hydrocarbon solvent such as hexane, heptane and the like.

The solid product thus obtained contains trivalent titanium, magnesium and hydrocarbyloxy group, and generally exhibits an amorphous character or a very weak crystalline character. From the viewpoint of catalytic performances, amorphous structure is more preferable.

The solid product obtained by the above-mentioned procedure is then treated with an ester compound.

The ester compound is used in an amount of 0.1 to 50 moles, preferably 0.3 to 20 moles and particularly preferably 0.5 to 10 moles, per one mole of the titanium atom in the solid product.

Per one mole of magnesium atom in the solid product, the ester compound is used in an amount of 0.01 to 1.0 mole, preferably 0.03 to 0.5 mole, and most preferably 0.05 to 0.4 mole. If the amount of the ester compound is excessively large, disintegration of solid product particle takes place.

The treatment of the solid product with an ester compound may be carried out by any known methods capable of contacting both the materials such as slurry method, mechanical pulverization using ball mill, and the like. However, mechanical pulverization is undesirable from the viewpoint of industry because it generates a large quantity of fine powder in the solid catalyst component and broadens its particle size distribution. Preferably, both the materials are contacted together in the presence of a diluent.

As the diluent, aliphatic hydrocarbons such as pentane, hexane, heptane, octane and the like, aromatic hydrocarbons such as benzene, toluene, xylene and the like, alicyclic hydrocarbons such as cyclohexane, cyclopentane and the like, and halogenated hydrocarbons such as 1,2-dichloroethane, monochlorobenzene and the like can be used. Among them, aromatic hydrocarbons and halogenated hydrocarbons are particularly preferable.

The diluent is used in an amount of 0.1 to 1,000 ml and preferably 1 to 100 ml, per 1 g of solid product. The temperature of the treatment is $-50°$ C. to 150° C., and preferably 0° C. to 120° C. The time period of the treatment is 10 minutes or longer, and preferably 20 minutes to 3 hours. After completion of the treatment, the mixture is allowed to stand to separate the solid matter from the liquid matter, and the solid matter is several times washed with an inert hydrocarbon solvent to obtain an ester-treated solid.

Next, the ester-treated solid is further treated with a mixture of an ether compound and titanium tetrachloride. This treatment is preferably carried out in a state of slurry. The solvents which can be used for formation of the slurry include aliphatic hydrocarbons such as pentane, hexane, heptane, octane, decane and the like; aromatic hydrocarbons such as toluene, xylene and the like; alicyclic hydrocarbons such as cyclohexane, methylcyclohexane, decaline and the like; and halogenated hydrocarbons such as dichloroethane, trichloroethane, trichloroethylene, monochlorobenzene, dichlorobenzene, trichlorobenzene and the like. Among them, halogenated hydrocarbons and aromatic hydrocarbons are preferable.

Concentration of the slurry is 0.05 to 0.7 g solid/ml solvent, and preferably 0.1 to 0.5 g solid/ml solvent. Temperature of the reaction is 30° C. to 150° C., preferably 45° C. to 120° C., and particularly preferably 60° C. to 100° C. Though the reaction time is not critical, it is usually 30 minutes to 6 hours.

As the method for feeding the ester-treated solid, the ether compound and titanium tetrachloride, a method which comprises adding an ether compound and titanium tetrachloride to an ester-treated solid and an inverse method which comprises adding an ester-treated solid to a solution containing an ether compound and titanium tetrahcloride are both adoptable.

In the method of adding an ether compound and titanium tetrachloride to an ester-treated solid, a method of adding an ether compound and thereafter adding titanium tetrachloride and a method of simultaneously adding an ether compound and titanium tetrachloride are preferable. Particularly preferably, a preliminarily prepared mixture of ether compound and titanium tetrachloride is added to an ester-treated solid.

The reaction of the ester-treated solid with the ether compound and titanium tetrachloride may be carried out repeatedly twice or more. From the viewpoint of catalytic activity and stereospecificity, it is preferable to repeat the reaction using a mixture of an ether compound and titanium tetrachloride at least twice.

The ether compound is used in an amount of 0.1 to 100 moles, preferably 0.5 to 50 moles and particularly preferably 1 to 20 moles, per one mole of titanium atom in the solid product.

The titanium tetrachloride is added in an amount of 1 to 1,000 moles, preferably 3 to 500 moles and particularly preferably 10 to 300 moles, per one mole of the titanium atom in the solid product.

The treatment of the ester-treated solid with a mixture of ether compound and titanium tetrachloride may be carried out in the presence of an ester compound. The ester compound for this purpose is used in an amount of 30 moles or less, preferably 15 moles or less and particularly preferably 5 moles or less, per one mole of the titanium atom in the solid product.

The trivalent titanium compound-containing solid catalyst precursor obtained by the above-mentioned procedure is subjected to a solid-liquid separation, and then the solid matter is several times washed with an inert hydrocarbon solvent such as hexane, heptane and the like and thereafter put to treatment with an olefin.

From the viewpoint of catalytic activity and stereospecificity, it is preferable to wash the solid matter having been separated from liquid matter at least once with a large quantity of halogenated hydrocarbon solvent such as monochlorobenzene or the like or aromatic hydrocarbon solvent such as toluene or the like at a temperature of 50° C. to 120° C., then additionally wash it with an aliphatic hydrocarbon solvent such as hexane or the like several times and thereafter put it to treatment using an olefin.

Next, the solid catalyst precursor thus obtained is treated with a small quantity of olefin in the presence of an organoaluminum compound This treatment is preferably carried out in the state of a slurry. As the solvent used for forming the slurry, inert hydrocarbon solvents such as propane, butane, pentane, hexane, heptane and octane can be referred to.

The amount of the organoaluminum compound may be selected from wide range such as 0.5 to 700 moles per one mole of titanium atom in the solid catalyst precursor. However, 0.8 to 500 mole is preferable, and 1 to 200 moles is particularly preferable.

The amount of the olefin used for the treatment is 0.05 to 1,000 g, preferably 0.1 to 500 g and particularly preferably 0.2 to 200 g, per one gram of the solid catalyst precursor.

Concentration of the slurry at the time of treatment is preferably 1 to 500 g solid/liter solvent and particularly preferably 3 to 300 g solid/liter solvent. Temperature of the treatment is preferably $-20°$ C. to 100° C. and particularly preferably 0° C. to 80° C. Partial pressure of the olefin in gas phase at the time of the treatment is 0.01 to 20 kg/cm$^2$ and preferably 0.1 to 10 kg/cm$^2$. Though the time of the treatment is not critical, it is usually 2 minutes to 15 hours.

As the method for feeding the solid catalyst precursor, organoaluminum compound and olefin, a method which comprises contacting a solid catalyst precursor with an organoaluminum compound and thereafter feeding an olefin and a method which comprises contacting a solid catalyst precursor with an olefin and thereafter feeding an organoaluminum compound are both usable. As the method for feeding the olefin, a method which comprises gradually feeding an olefin while maintaining a predetermined pressure in the treating tank and a method which comprises wholly feeding the predetermined quantity of olefin at the beginning are both usable.

In treating a solid catalyst precursor with a small quantity of olefin in the presence of an organoaluminum compound, an electron donor may be added to the system if desired. The amount of the electron donor is 0.01 to 400 moles, preferably 0.02 to 200 moles and particularly preferably 0.03 to 100 moles, per one mole of titanium atom in the solid catalyst precursor; and 0.005 to 5 moles, preferably 0.01 to 3 moles and particularly preferably 0.015 to 1.0 mole per one mole of organoaluminum compound.

The method for feeding the electron donor is not critical, and it may be fed separately from the organoaluminum compound or may be fed after a previous contact with the organoaluminum compound. It is also possible to previously react an electron donor with an organoaluminum compound chemically and feed the reaction product for the sake of treatment using an olefin.

The trivalent titanium compound-containing solid catalyst component obtained by the above-mentioned procedure is subjected to a solid-liquid separation and thereafter either dried directly or washed several times with an inert hydrocarbon solvent such as butane, pentane, hexane, heptane or the like and then dried. Subsequently, it is used for polymerization.

The method of drying is not limited particularly, so far as it is carried out in an atmosphere of inert gas such as argon or the like. As a method for introducing heat at the time of drying, the methods of hot gas heat input, conduction heat input, radiation heat input and high frequency wave heat input are also usable. As the drying type of powder, material standing type, material conveying type, material agitating type and hot gas conveying type are also usable. Concretely speaking, the drying can be effected by the use of vacuum box type drier, freeze drying apparatus, box type drier, ordinary pressure drum drier, vacuum drum drier, vertical drier, cylindrical drier, band drier, ventilation rotary drier, ventilation agitation drier, fluidized bed drier, cylindrical agitation drier, multi-stage disc drier, grooved agitation drier, spray drier, gas stream drier and the like. Further, the drying can also be carried out by the use of combination of these driers. Among these drying methods, a drying method using a drier in which ventilation and agitation are combined exhibits a particularly remarkable effect of this invention.

The solid catalyst component of this invention is combined with an organoaluminum compound and an electron donor and put to use in polymerization of olefin. The organoaluminum compound and the electron donor used for this purpose can be selected from those mentioned above in the paragraph of olefin-treatment of solid catalyst precursor.

Method for Polymerization of Olefin

The method for feeding the catalyst components into polymerization reactor is not critical, so far as they are fed in a water-free state in an inert gas such as nitrogen, argon or the like.

The solid catalyst component, organoaluminum compound and electron donor may be fed separately, or any two of them may be previously contacted together and then fed. It is also possible to feed an organoaluminum compound and an electron donor after previously reacting them chemically.

The polymerization can be carried out at a temperature of $-30°$ C. to $300°$ C. preferably $-20°$ C. to $240°$ C., particularly preferably $0°$ C. to $120°$ C. Though pressure of the polymerization is not critical, a pressure ranging from about 3 atmospheres to about 2,000 atmospheres is preferable from the viewpoint of industrial practicability and economicity. As the process of polymerization, continuous process and batch process are both adoptable. Slurry polymerization or solution polymerization using an inert hydrocarbon solvent such as propane, butane, pentane, hexane, heptane or octane, liquid polymerization using no solvent, and gas phase polymerization are also adoptable. As the organoaluminum compound and electron donor, the same compounds as used in the previous steps can be used.

The $\alpha$-olefins which can be polymerized with the polymerization catalyst component of this invention are those having 3 or more carbon atoms. Concrete examples of the $\alpha$-olefin include propylene, butene-1, pentene-1, hexene-1, 3-methylbutene-1, 3-methylpentene-1, 4-methylpentene-1, octene-1, decene-1, dodecene-1 and the like, although this invention is by no means limited by them. The polymerization according to this invention can be practised in any modes of homopolymerization and copolymerization. In case of copolymerization, two or more species of olefins selected from the group consisting of ethylene and $\alpha$-olefins are mixed together and contacted with the catalyst, whereby a copolymer can be obtained. A heteroblock copolymerization in which the polymerization is carried out in two or more steps can also be effected easily. For regulating molecular weight of the polymer, a chain transfer agent such as hydrogen and the like can also be added.

Next, this invention will be illustrated in more detail by way of the following examples and comparative examples. This invention is by no means limited by the examples.

EXAMPLE 1

Synthesis of Organomagnesium Compound

After replacing inner atmosphere of a one liter flask equipped with a stirrer, a reflux condenser, a dropping funnel and a thermometer with argon gas, 32.0 g of sliced metallic magnesium for Grignard reagent was introduced into the flask. After charging 120 g of butyl chloride and 500 ml of dibutyl ether into the dropping funnel, about 30 ml of the mixture was dropwise added onto the magnesium in the flask to start a reaction. After start of the reaction, the dropping was continued at 50° C. for 4 hours. After completion of dropping, the reaction was continued for an additional one hour at 60° C. Then, the reaction mixture was cooled to room temperature and the liquid matter was separated from solid.

The butylmagnesium chloride dissolved in the dibutyl ether was hydrolyzed with 1N sulfuric acid, and the remaining sulfuric acid was back titrated with 1N aqueous solution of sodium hydroxide to determine the concentration of butylmagnesium chloride, using phenolphthalein as an indicator. As the result, its concentration was 2.1 moles/liter.

Synthesis of Solid Product

After replacing inner atmosphere of a 500 ml flask equipped with a stirrer, a dropping funnel and a thermometer with argon gas, 240 ml of hexane, 6.70 g (19.7 mmoles) of tetrabutoxytitanium and 61.4 g (295 mmoles) of tetraethoxysilane were charged and made into a uniform solution. Then, 150 ml of the organomagnesium compound synthesized in (a) was slowly dropped from the dropping funnel over a period of 5.75 hours, while keeping the inner temperature of the flask at 5° C. After completion of dropping, the content of the flask was stirred at 20° C. for an additional one hour, and then the solid matter was separated from liquid and twice washed with each 217 ml portion of toluene. Then, a part of the solid was sampled out and dried, and its composition was analyzed to reveal that the solid product contained 2.0% by weight of titanium atom, 34.1% by weight of ethoxy group and 3.1% by weight of butoxy group.

Wide angle X ray diffraction chart, using Cu-Ka ray, of the solid product exhibited no clear diffraction peak at all, demonstrating its amorphous structure.

Synthesis of Ester-Treated Solid

After completing the washing step of (b), toluene was added into the flask to prepare 250 ml of slurry. Then, 27.0 ml (101 mmoles) of diisobutyl phthalate was added and reacted at 95° C. for 30 minutes.

After the reaction, the solid matter was separated from liquid and once washed with 217 ml of toluene.

Synthesis of Solid catalyst Precursor

After completing the washing step of (c), toluene was added into the flask to prepare 107 ml of a slurry. Further, 1.2 ml (4.5 mmoles) of diisobutyl phthalate, 2.3 ml (14 mmoles) of butyl ether and 90 ml (820 mmoles) of titanium tetrachloride were added and reacted at 95° C. for 3 hours. After the reaction, the solid matter was separated from liquid at 95° C. and once washed with 217 ml of toluene at that temperature. Then, the above-mentioned treatment using diisobutyl phthalate, butyl ether and titanium tetrachloride was repeated once more under the same conditions as above, and the solid matter was washed first three times with each 217 ml portion of toluene at 95° C. and thereafter three times with each 194 ml portion of hexane at room temperature to obtain a solid catalyst precursor. Then, 194 ml portion of hexane was introduced to obtain a slurry containing a solid catalyst precursor. One milliliter of the slurry thus obtained contained 0.18 g of solid catalyst precursor. The solid catalyst precursor contained 2.2% by weight of titanium atom, 19.1% by weight of magnesium atom and 12.2% by weight of phthalic ester.

Synthesis of Solid Catalyst Component

After replacing inner atmosphere of a 300 ml flask equipped with a stirrer and a thermometer, with argon gas, 34 ml of the slurry containing a solid catalyst precursor which had been obtained in (d), 156 ml of hexane, 9.0 mmoles of triethylaluminum and 1.35 mmoles of phenyltrimethoxysilane were charged, and then inner atmosphere of the flask was replaced with propylene gas. Further, 8 g of propylene gas was fed into the flask over a period of 33 minutes at room temperature, after which inner atmosphere of the flask was again replaced with argon gas, and stirring was continued for one hour.

After completion of the reaction, the solid matter was separated from liquid and dried under a stream of argon gas with stirring at 75° C. for 2 hours to obtain 2.5 g of a solid catalyst component. It contained 0.34% by weight of hydrocarbon solvent and 49% by weight of solid catalyst precursor.

Polymerization of Propylene

After replacing inner atmosphere of a stainless steel autoclave equiped with a magnetic stirrer and a thermometer having a capacity of 130 ml with argon gas, 0.57 mmole of triethylaluminum, 0.057 mmole of phenyltriethoxysilane, 10.1 mg the solid catalyst component obtained in (e) and 80 ml of liquefied propylene were charged into the autoclave.

While stirring the content of the autoclave, it was kept at 60° C. for one hour. After discharging the excessive propylene, the formed polypropylene was air-dried for 24 hours. Thus, 16.36 g of polypropylene was obtained.

This means that yield (g) of polypropylene per one gram of solid catalyst component (hereinafter referred to as "PP/cat") was 1,620.

When the polypropylene powder thus obtained was extracted with boiling heptane for 6 hours, the percentage of residue [hereinafter referred to as "IY" (% by weight)] was 98.5 (% by weight). Bulk density [hereinafter referred to as "BD" (g/ml)]of the polypropylene powder was 0.47 (g/ml).

Measurement of Particle Size Distribution of Polypropylene Powder

Figure 1:
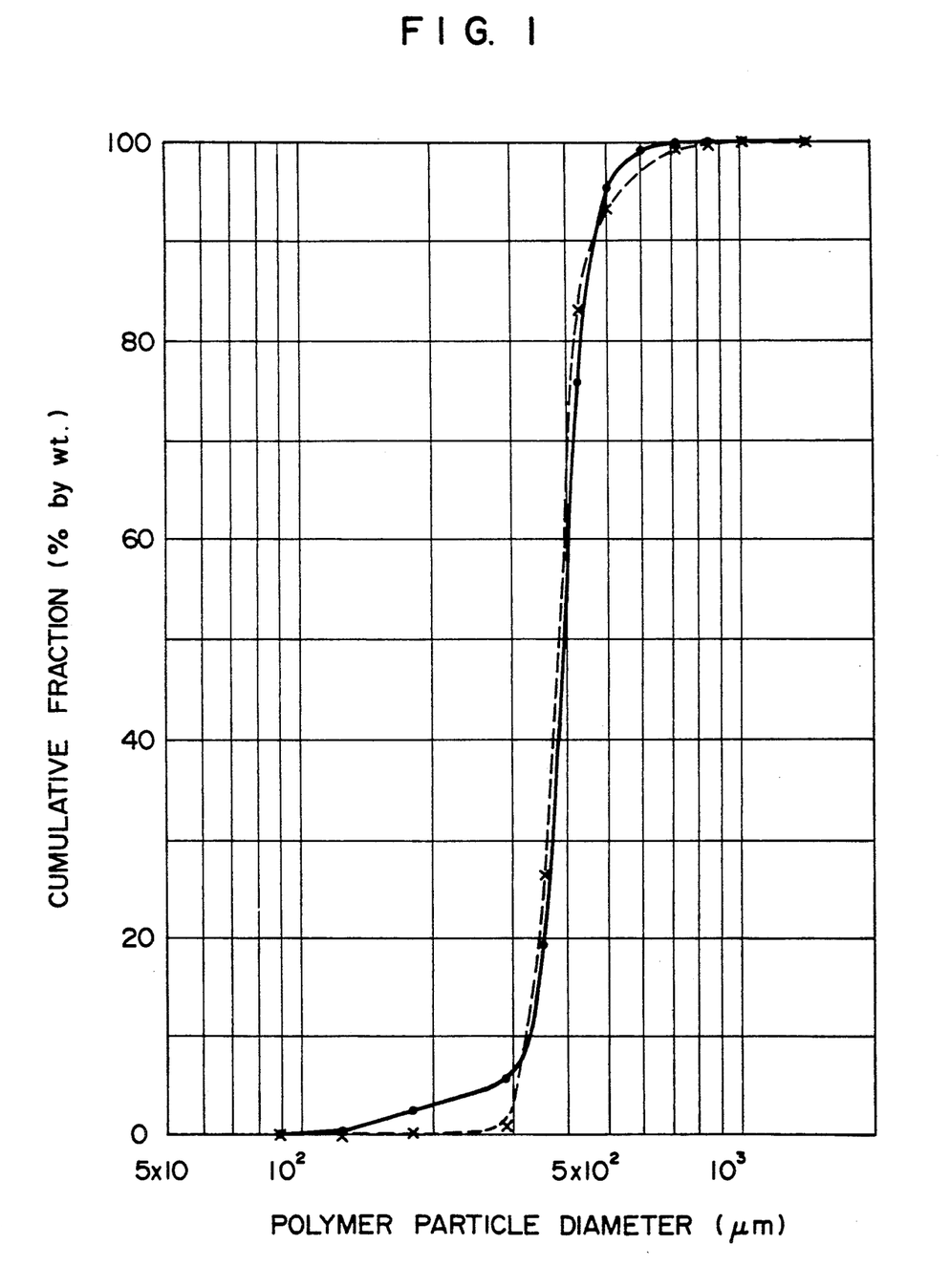
FIG. 1 is a particle size distribution curve of polypropylene powder, wherein the dotted line illustrates a particle size distribution curve of polypropylene powder obtained in Example 1, and the solid line illustrates a particle size distribution curve of the polypropylene powder obtained in Comparative Example 1.
Figure 2:
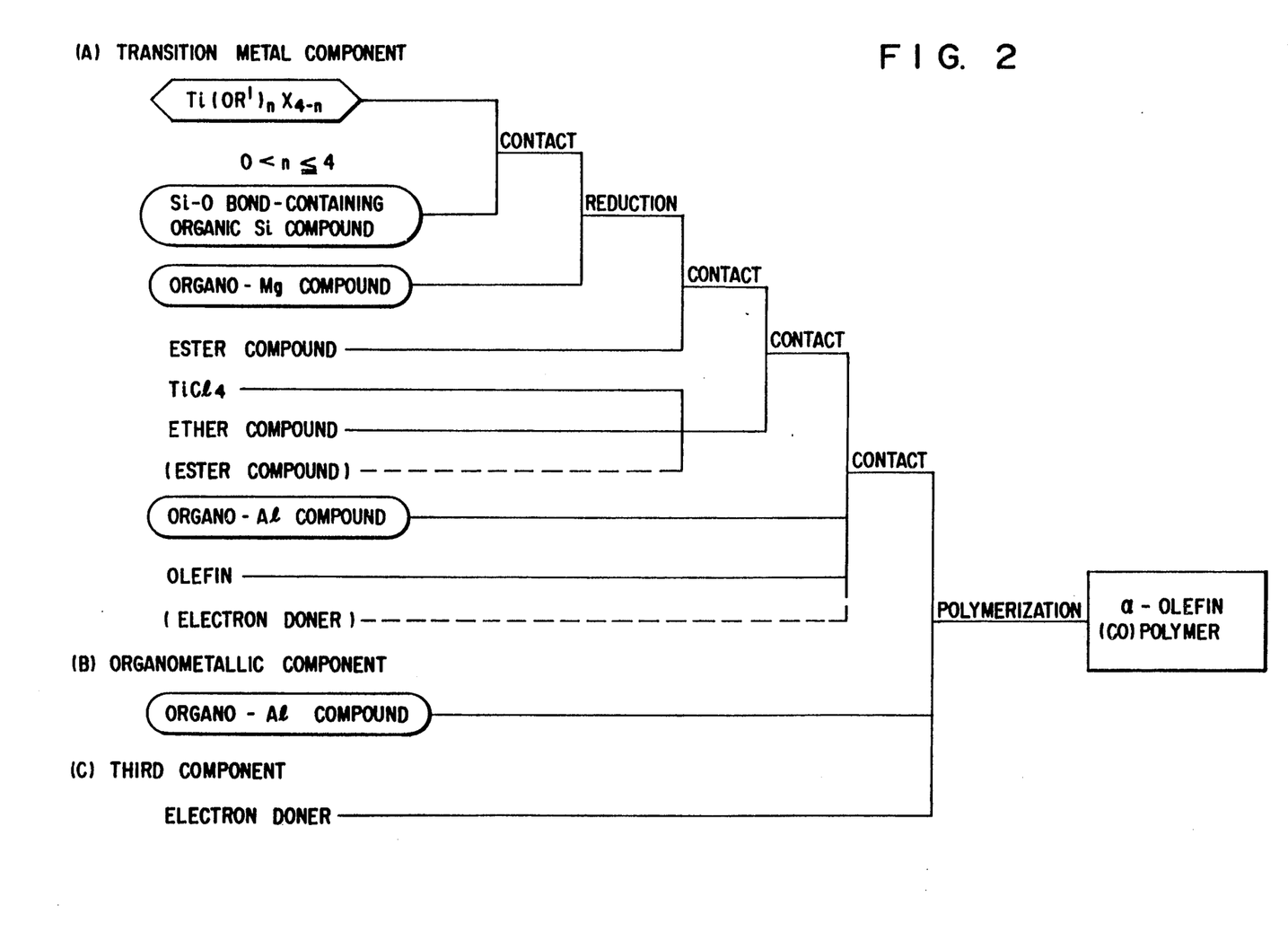
FIG. 2 is a flow chart diagram for facilitating understanding of this invention. The flow chart is nothing more than a typical example of the embodiments of this invention, and this invention is by no means limited thereby.

The polypropylene powder obtained in (f) was fractionated by means of JIS Standard Sieve having a mesh size of 88 to 1,400 $\mu$m. The polymers remaining on sieves were weighed, and their proportions to total polymer weight were determined and cumulated from the side of smaller particle diameter. The results of the sieving were shown in Table 1 and FIG. 1 as cumulative fractions (% by weight). Bulk densities (BD) are also shown in Table 1.

Comparative Example 1

Drying of Solid Catalyst Precursor

After replacing a 200 ml flask equipped with a stirrer with argon gas, 27 ml of the slurry containing a solid catalyst precursor, obtained in Example 1(d), was added into the flask and the solid catalyst precursor was separated from liquid by evacuating the liquid through glass filter which was connected with tube and inserted into the slurry. Then, the residual catalyst precursor was dried with stirring under a stream of argon gas at 75° C. for 2 hours to obtain 4.8 g of a solid catalyst precursor. It contained 0.59% by weight of hydrocarbon solvent.

Polymerization of Propylene

Propylene was polymerized in the same manner as in Example 1(f), except that the solid catalyst precursor obtained in (a) of this example was used as solid catalyst component. The results were as follows: PP/cat =3,570, IY=97.7% by weight, BD=0.44 g/ml.

Particle size distribution of the polypropylene powder thus obtained was determined in the same manner as in Example 1(g). The results are shown in Table 1 and FIG. 1.

Since no treatment using small quantity of olefin was carried out in this example, the cumulative fraction of polymer having smaller particle diameter having remained on the sieves up to a sieve dimension of 125 $\mu$m was 2.67% by weight, indicating that the proportion of fine powdery polymer was much greater than in Example 1. Further, the polymer had a low bulk density.

EXAMPLE 2

Synthesis of Solid Catalyst Component

A solid catalyst component was synthesized in the same manner as in Example 1(e), except that the quantity of propylene gas fed into the flask was 5 g. The solid catalyst component thus obtained contained 0.42% by weight of hydrocarbon solvent and 61% by weight of solid catalyst precursor.

Polymerization of Propylene

Propylene was polymerized in the same manner as in Example 1(f), except that the solid catalyst component obtained in (a) of this example was used.

The results were as follows: PP/cat=1,980, IY =97.1% by weight, BD=0.46 g/ml.

Particle size distribution of the polypropylene powder thus obtained was determined in the same manner as in Example 1(g). The results are shown in Table 1.

EXAMPLE 3

Preparation of Organoaluminum Component

After replacing inner atmosphere of a 100 ml flask equipped with a stirrer and a thermometer, with argon gas, 41.7 ml of heptane, 5.74 g (50 mmoles) of triethylaluminum and 1.49 g (7.5 moles) of phenyltrimethoxysilane were charged and reacted at 60° C. for 6 hours with stirring.

Synthesis of Solid Catalyst Component

A solid catalyst component was synthesized in the same manner as in Example 2(a), except that the triethylaluminum and phenyltrimethoxysilane used in Example 2(a) were replaced with the reaction product of (a) of this example. The solid catalyst component thus obtained contained 0.35% by weight of hydrocarbon solvent and 57% by weight of solid catalyst precursor.

Polymerization of Propylene

Propylene was polymerized in the same manner as in Example 1(f), except that the solid catalyst component obtained in (b) of this example was used, and the triethylaluminum and phenyltrimethoxysilane used in Example 1(f) were replaced with the reaction product obtained in (a) of this example. The results were as follows: PP/cat=2,750, IY=99.1% by weight, BD=0.46 g/ml. Further, particle size distribution of the polypropylene powder obtained herein was determined in the same manner as in Example 1(g) to obtain the results shown in Table 1.

EXAMPLE 4

Syhthesis of Solid Catalyst Component

After replacing inner atmosphere of a 300 ml flask equipped with a stirrer and a thermometer with argon gas, 36 ml of the slurry containing a solid catalyst precursor, obtained in Example 1(d), was charged together with 161 ml of hexane and 9.2 mmoles of triethylaluminum. Then, ethylene gas was introduced into the mixture at ordinary pressure at a rate of 300 ml/minute, over a period of 15 minutes. After completion of the reaction, the solid matter was separated from liquid and dried with stirring at 75° C. for 2 hours under a stream of argon gas to obtain 10.0 g of a solid catalyst component. The solid catalyst component contained 0.56% by weight of hydrocarbon solvent and 60% by weight of solid catalyst precursor.

Polymerization of Propylene

Propylene was polymerized in the same manner as in Example 1(f), except that the solid catalyst component obtained in (a) of this example was used. The results were as follows: PP/cat=1,900, IY=92.3% by weight, BD =0.46 g/ml.

Further, particle size distribution of the polypropylene powder obtained herein was determined in the same manner as in Example 1(g) to obtain the results shown in Table 1.

EXAMPLE 5

Synthesis of Solid Catalyst Component

A solid catalyst component was synthesized in the same manner as in Example 2(a), except that the phenyltrimethoxysilane used in Example 2(a) was replaced with cyclohexylethyldimethoxysilane. The solid catalyst component thus obtained contained 0.47% by weight of hydrocarbon solvent and 62% by weight of solid catalyst precursor.

Polymerization of Propylene

Propylene was polymerized in the same manner as in Example 1(f), except that the solid catalyst component obtained in (a) of this example was used and the phenyltriethoxysilane was replaced with cyclohexylethyldimethoxysilane. The results were as follows: PP/cat=2,250, IY=99.0% by weight, BD=0.46 g/ml. Further, particle size distribution of the polypropylene powder obtained herein was determined in the same manner as in Example 1(g) to obtain the results shown in Table 1.

EXAMPLE 6

Synthesis of Solid Catalyst Component

A solid catalyst component was synthesized in the same manner as in Example 2(a), except that the phenyltrimethoxysilane used in Example 2(a) was replaced with t-butylmethyldimethoxysilane. The solid catalyst component thus obtained contained 0.39% by weight of hydrocarbon solvent and 57% by weight of solid catalyst precursor.

Polymerization of Propylene

Propylene was polymerized in the same manner as in Example 1(f), except that the solid catalyst component obtained in (a) of this example was used, and the phenyltriethoxysilane was replaced with t-butylmethyldimethoxysilane. The results were as follows: PP/cat =2,070, IY =99.5% by weight, BD =0.46 g/ml. Further, particle size distribution of the polypropylene powder obtained herein was determined in the same manner as in Example 1(g) to obtain the results shown in Table 1.

EXAMPLE 7

Syhthesis of Solid Catalyst Component

A solid catalyst component was synthesized in the same manner as in Example 2(a), except that the 1.35 mmoles of phenyltrimethoxysilane used in Example 2(a) was replaced with 2.70 mmoles of 2,2,6,6-tetramethylpiperidine. The solid catalyst component thus obtained contained 0.37% by weight of hydrocarbon solvent and 60% by weight of solid catalyst precursor.

Polymerization of Propylene

Propylene was polymerized in the same manner as in Example 1(f), except that the solid catalyst component obtained in (a) of this example was used, and the 0.057 mmole of phenyltriethoxysilane used in Example 1(f) was replaced with 0.114 mmole of 2,2,6,6-tetramethylpiperidine. The results were as follows: PP/cat=3,790, IY=93.7% by weight, BD=0.46 g/ml. Further, particle size distribution of the polypropylene powder obtained herein was determined in the same manner as in Example 1(g) to obtain the results shown in Table 1.

As has been mentioned above, the use of the solid catalyst component of this invention brings about the following effects:

(1) Since the solid catalyst component of this invention has a very high catalytic activity per one titanium atom, coloration of polymer can be prevented and the contents of halogen and titanium atoms closely related to corrosiveness of polymers can be minimized, even if no particular procedure for removing catalyst residue is provided. This makes the apparatus for removing catalyst residue unnecessary and makes it possible to reduce the production cost of α-olefin polymer.

(2) The use of the solid catalyst component of this invention makes it possible to produce a very highly stereospecific α-olefin polymer. Since only a very small quantity of amorphous polymer is formed as by-product, an α-olefin polymer excellent in mechanical properties can be produced without removing amorphous polymer.

(3) Since polymer having a low stereospecificity and soluble in polymerization medium is formed only in a very small quantity, there occur no troubles in the process such as deposition of polymer onto the reactor, pipings, flash hopper, etc. Further, since soluble polymer is formed only in a small quantity, the starting monomer can be utilized effectively.

(4) By the use of the solid catalyst component of this invention, α-olefin polymers having a very high bulk density can be produced. This makes it possible to reduce the size of production apparatuses such as reactor and thereby to enhance productivity greatly.

(5) Since the solid catalyst component of this invention is excellent in crush resistance, formation of fine powder from it is much prevented and it retains an excellent particle size distribution. This means that formation of fine powder α-olefin polymer can also be prevented, because the resulting α-olefin polymer resembles the solid catalyst component in shape. Accordingly, the troubles caused by fine powders such as clogging in pipings, mass formation in reactor, etc. can be prevented from occurring.

wherein $R^1$ represents a hydrocarbon group having 1 to 20 carbon atoms, X represents a halogen atom and n represents a number satisfying $0 < n \leq 4$, with an organomagnesium compound in the presence of an organic silicon compound of the following general formulas $$Si(OR^2)_m R^3_{4-m}$$

$$R^4 R^5_2 SiO)_p SiR^6_3 \text{ or}$$

$$(R^7_2 SiO)_q$$

wherein $R^2$ represents a hydrocarbon group having 1 to 20 carbon atoms, $R^3$, $R^4$, $R^5$, $R^6$ and $R^7$ each represents a hydrocarbon group having 1 to 20 carbon atoms or a hydrogen atom, m represents a number satisfying $0 < m \leq 4$, p represents an integer of 1 to 1,000, and q represents an integer of 2 to 1,000 to produce a solid product, treating the solid product with a carboxylic acid ester, treating the ester-treated solid product with a mixture of an ether compound and titanium tetrachloride or with a mixture of an ether compound, titanium tetrachloride and a carboxylic acid ester to obtain a trivalent titanium compound-containing solid catalyst precursor, and prepolymerizing on the solid catalyst precursor a small quantity of an olefin in the presence of an organoaluminum compound to obtain a solid catalyst component for use in the polymerization of α-olefins.

2. A solid catalyst component according to claim 1, wherein $R^1$ in the general formula $Ti(OR^1)_n X_{4-n}$ is an alkyl group having 2 to 18 carbon atoms or an aryl group having 6 to 18 carbon atoms.

3. A solid catalyst component according to claim 1, wherein $R^1$ in the general formula $Ti(OR^1)_n X_{4-n}$ is a straight chain alkyl group having 2 to 18 carbon atoms.

4. A solid catalyst component according to claim 1,

TABLE 1

| Dimension of sieve (μm) | Cumulative fraction (% by wt.) | | | | | | | |
|---|---|---|---|---|---|---|---|---|
| | Example 1 | Comparative Example 1 | Example 2 | Example 3 | Example 4 | Example 5 | Example 6 | Example 7 |
| 1400 | 100.0 | 100.0 | 100.0 | 100.0 | 100.0 | 100.0 | 100.0 | 100.0 |
| 1000 | 100.0 | 100.0 | 99.7 | 99.7 | 99.7 | 99.8 | 100.0 | 96.3 |
| 850 | 99.8 | 100.0 | 99.2 | 99.2 | 99.6 | 99.6 | 100.0 | 94.8 |
| 710 | 99.6 | 100.0 | 98.4 | 98.7 | 99.3 | 99.5 | 100.0 | 92.9 |
| 590 | 99.4 | 100.0 | 97.5 | 95.3 | 99.2 | 99.3 | 100.0 | 90.9 |
| 500 | 96.0 | 99.2 | 90.4 | 92.8 | 98.3 | 98.0 | 99.3 | 80.3 |
| 420 | 93.3 | 95.3 | 84.3 | 88.7 | 97.6 | 96.1 | 98.3 | 58.0 |
| 350 | 83.0 | 75.8 | 67.9 | 70.9 | 84.7 | 82.5 | 87.2 | 24.5 |
| 287 | 26.5 | 19.3 | 19.3 | 30.5 | 17.7 | 24.3 | 19.2 | 1.49 |
| 177 | 0.90 | 5.53 | 0.62 | 1.45 | 1.70 | 1.07 | 1.62 | 0.09 |
| 125 | 0.30 | 2.67 | 0.18 | 0.26 | 0.36 | 0.44 | 0.72 | 0.00 |
| 88 | 0.00 | 0.59 | 0.00 | 0.00 | 0.00 | 0.09 | 0.18 | 0.00 |
| Pan | 0.00 | 0.30 | 0.00 | 0.00 | 0.00 | 0.00 | 0.09 | 0.00 |
| Bulk density (BD) | 0.47 | 0.44 | 0.46 | 0.46 | 0.46 | 0.46 | 0.46 | 0.46 |

What is claimed is:

1. A solid-catalyst component for use in the polymerization of α-olefins obtained by reducing a titanium compound represented by the following general formula:

$$Ti(OR^1)_n X_{4-n}$$

wherein the halogen atom is chlorine, bromine or iodine.

5. A solid catalyst component according to claim 1, wherein n in the general formula $Ti(OR^1)_n X_{4-n}$ is $2 \leq n \leq 4$.

6. A solid catalyst component according to claim 1, wherein the organic silicon compound is alkoxysilane compound represented by the general formula Si-$(OR^2)_m R^3_{4-m}$ where m satisfies $1 \leq m \leq 4$.

7. A solid catalyst component according to claim 6, wherein the organic silicon compound is tetraalkoxysilane compound where m=4.

8. A solid catalyst component according to claim 6, wherein the organomagnesium compound is a Grignard compound represented by general formula $R^8MgX$, wherein $R^8$ represents a hydrocarbon group having 1 to 20 carbon atoms and X represents a halogen, or a dialkyl- or diaryl-magnesium compound represented by general formula $R^9R^{10}Mg$, wherein $R^9$ and $R^{10}$ each represents a hydrocarbon group having 1 to 20 carbon atoms.

9. A solid catalyst component according to claim 8, wherein the Grignard compound is methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, phenylmagnesium chloride or phenylmagnesium bromide.

10. A solid catalyst component according to claim 8, wherein the dialky- or diaryl-magnesium compound is diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, or diphenylmagnesium.

11. A solid catalyst component according to claim 1, wherein the ester compound is aliphatic carboxylic ester, olefinic carboxylic ester, alicyclic carboxylic ester or aromatic carboxylic ester.

12. A solid catalyst component according to claim 1, wherein the ester compound is methacrylic ester, maleic ester or phthalic ester.

13. A solid catalyst component according to claim 1, wherein the ether compound is diethyl ether, dipropyl ether, diisopropyl ether, dibutyl ether, diamyl ether, diisoamyl ether, dineopentyl ether, dihexyl ether, dioctyl ether, methyl butyl ether, methyl isoamyl ether or ethyl isobutyl ether.

14. A solid catalyst component according to claim 1, wherein the ether compound is dibutyl ether or diisoamyl ether.

15. A solid catalyst component according to claim 1, wherein the olefin is that having 2 to 20 carbon atoms.

16. A solid catalyst component according to claim 15, wherein the olefin is ethylene, propylene, butene-1, pentene-1, hexene-1, 3-methylbutene-1, 3-methylpentene-1, 4-methylpentene-1, octene-1, decene-1 or dodecene-1.

17. A solid catalyst component according to claim 1, wherein the organoaluminum compound is that represented by the following general formulas:

wherein $R^{11}$, $R^{12}$, $R^{13}$, $R^{14}$ and $R^{15}$ each represents a hydrocarbon group having 1 to 20 carbon atoms, Y represents halogen, hydrogen or an alkoxy group, and $\gamma$ represents a number satisfying $2 \leq \gamma \leq 3$.

18. A solid catalyst component according to claim 17, wherein the organoaluminum compound is trialkylaluminum, a mixture of trialkylaluminum and dialkylaluminum halide or alkylalumoxane.

19. A solid catalyst component according to claim 1, wherein the organoaluminum compound is triethylaluminum, triisobutylaluminum, a mixture of triethylaluminum and diethylaluminum chloride, or tetraethyldialumoxane.

20. A solid catalyst component according to claim 1, wherein prepolymerization on the solid catalyst precursor of a small quantity of olefin int eh presence of an organoaluminum compound is carried out in the presence of an electron donor.

21. A solid catalyst component according to claim 20, wherein the electron donor is one selected from the group consisting of organic silicon compounds having Si—$OR^{16}$ bond wherein $R^{16}$ represents a hydrocarbon group having 1 to 20 carbon atoms or a Si—N—C bond, aromatic carboxylic ester compounds and sterically hindered amines.

22. A solid catalyst component according to claim 21, wherein the electron donor is alkoxysilane compound represented by the general formula $R^{17}_t Si(OR^{16})_{4-t}$ or 2,6-substituted piperidine wherein $R^{16}$ and $R^{17}$ each represents a hydrocarbon group having 1 to 20 carbon atoms and t represents a number satisfying $0 \leq t \leq 3$.

23. A solid catalyst component according to claim 22, wherein the 2,6-substituted piperidine is 2,2,6,6-tetramethylpiperidine.

24. A solid catalyst component according to claim 1, wherein the production of solid product by the reduction of a titanium compound with an organomagnesium compound is carried out in the presence of a porous material made of inorganic oxide or organic polymer.

25. A solid catalyst component according to claim 1, wherein in the reduction, the organic silicon compound is used in an amount of 1 to 50 in terms of atomic ratio of silicon atom to titanium atom (Si/Ti), and the organomagnesium compound is used in an amount of 0.1 to 10 in terms of atomic ratio of the sum of titanium and silicon atoms to magnesium atom (Ti+Si/Mg).

26. A solid catalyst component according to claim 1, wherein the reduction is carried out in a solvent at $-50°$ to $70°$ C. for 30 minutes to 6 hours.

27. A solid catalyst component according to claim 1, wherein in the ester-treatment, the ester compound is used in an amount of 0.1 to 50 moles per one mole of the titanium atom in the solid product and in an amount of 0.01 to 1.0 mole per one mole of magnesium atom in the solid product.

28. A solid catalyst component according to claim 1, wherein the ester-treatment is carried out in a diluent at $-50°$ to $150°$ C. for 10 minutes or longer.

29. A solid catalyst component according to claim 1, wherein in the treatment of the ester-treated product, the ether compound is used in an amount of 0.1 to 100 moles and the titanium tetrachloride is used in an amount of 1 to 1,000 moles, and the ester compound is used if necessary in an amount of 30 moles or less per one mole of the titanium atom in the solid product, respectively.

30. A solid catalyst component according to claim 1, wherein the treatment of the ester-treated product is carried out in a slurry state in solvent at $30°$ to $150°$ C. for 30 minutes to 6 hours.

31. A solid catalyst component according to claim 1, wherein in the olefin-prepolymerization, the organoaluminum compound is used in an amount of 0.5 to 700 moles per one mole of titanium atom in the solid catalyst precursor, and the olefin is used in an amount of 0.05 to 1,000 g per one gram of the solid catalyst precursor.

32. A solid catalyst component according to claim 1, wherein the olefin-prepolymerization is carried out in a slurry state at $-20°$ to $100°$ C. for 2 minutes to 15 hours with olefin-partial pressure of 0.01 to 20 kg/cm².

* * * * *